(12) United States Patent
Grosse et al.

(10) Patent No.: US 8,776,217 B2
(45) Date of Patent: Jul. 8, 2014

(54) METHODS AND APPARATUS FOR DETECTING UNWANTED TRAFFIC IN ONE OR MORE PACKET NETWORKS UTILIZING STRING ANALYSIS

(75) Inventors: Eric H. Grosse, Berkeley Heights, NJ (US); Clifford E. Martin, Martinsville, NJ (US)

(73) Assignee: Alcatel Lucent, Paris (FR)

( * ) Notice: Subject to any disclaimer, the term of this patent is extended or adjusted under 35 U.S.C. 154(b) by 1092 days.

(21) Appl. No.: 11/592,739

(22) Filed: Nov. 3, 2006

(65) Prior Publication Data

US 2008/0109905 A1    May 8, 2008

(51) Int. Cl.
*G06F 21/00* (2013.01)
(52) U.S. Cl.
USPC .......................................................... 726/22
(58) Field of Classification Search
USPC ..................................................... 726/22–24
See application file for complete search history.

(56) References Cited

U.S. PATENT DOCUMENTS

| 6,487,666 | B1 | 11/2002 | Shanklin et al. | |
|---|---|---|---|---|
| 2003/0037141 | A1 | 2/2003 | Milo et al. | |
| 2003/0217283 | A1 | 11/2003 | Hrastar et al. | |
| 2006/0101039 | A1* | 5/2006 | Huber | 707/100 |
| 2006/0248588 | A1* | 11/2006 | Jayaraman | 726/22 |
| 2007/0250931 | A1* | 10/2007 | Takahashi | 726/24 |

FOREIGN PATENT DOCUMENTS

| CN | 1645336 A | 7/2005 |
|---|---|---|
| EP | 1 701 285 A | 9/2006 |
| JP | 2003-067268 | 3/2003 |
| JP | 2003-241989 | 8/2003 |
| WO | WO 2006/056223 A | 6/2006 |

OTHER PUBLICATIONS

Guardian. "Best Practices for Handling Hostile Probes" Downloaded Nov. 2, 2009. pp. 1-3. http://www.xav.com/scripts/guardian/help/1013.html.*
Guardian. "Fluid Dynamics Software Corporation" Version History. Downloaded Nov. 2, 2009. pp. 1-5. http://www.xav.com/scripts/guardian/changes.html.*
Salvatore et al., "Cost Based Modeling and Evaluation for Data Mining with application to Fraud and Intrusion Detection: Results from the JAM Project", 2000 (Internet Archive Wayback Machine), pp. 1-3.*

(Continued)

*Primary Examiner* — Lisa Lewis
(74) *Attorney, Agent, or Firm* — Ryan, Mason & Lewis, LLP

(57) ABSTRACT

Methods and apparatus are provided for detecting unwanted traffic in one or more packet networks utilizing string analysis. Unwanted traffic received by a target victim, such as a malicious attack, is detected by maintaining a rule base identifying one or more string expressions; analyzing one or more error entries in a log file, the log file comprising one or more requests received by the target victim; determining if the one or more requests include a string that matches one or more of the string expressions in the rule base; and sending a denunciation message to a central filter if the one or more requests include a string that matches one or more of the string expressions in the rule base. The string expressions may comprise, for example, a string or a regular expression and can represent one or more resources that an attacker may attempt to access.

20 Claims, 5 Drawing Sheets

(56) References Cited

OTHER PUBLICATIONS

E. Grosse, "Methods and Apparatus for Defending Against Denial of Service Attacks in IP Networks Based on Specified Source/Destination IP Address Pairs," U.S. Appl. No. 11/197,841, filed Aug. 5, 2005.
Grosse et al., "Method and Apparatus for Defending Against Denial of Service Attacks in IP Networks by Target Victum Self-Identification and Control," U.S. Appl. No. 11/197,842, filed Aug. 5, 2005.
Sarah Sorensen, "Using Compound Signatures to Protect Against Complex Attacks," Juniper Networks, Inc., 2004.
"Security Method for EC age", Nikkei Internet Technology No. 39. Nikkei Business Publicaitons, Inc., Sep. 22, 2000.
"Office, Practical Intrusion Detecting Application Method", Security Magazine No. 2, Japan Shyouei Co. Ltd., vol. 8, pp. 107-119, Mar. 1, 2002.

* cited by examiner

DETECTOR RULE BASE - 600

| STRING | ACTION |
|---|---|
| %3f.jsp | DROP |
| ⋮ | ⋮ |
| COMMAND.exe | DROP |

METHODS AND APPARATUS FOR DETECTING UNWANTED TRAFFIC IN ONE OR MORE PACKET NETWORKS UTILIZING STRING ANALYSIS

CROSS-REFERENCE TO RELATED APPLICATION

The present application is related to U.S. patent application Ser. No. 11/197,842, entitled "Method and Apparatus for Defending Against Denial of Service Attacks in IP Networks by Target Victim Self-Identification and Control," and U.S. patent application Ser. No. 11/197,841, entitled "Method and Apparatus for Defending Against Denial of Service Attacks in IP Networks Based on Specified Source/Destination IP Address Pairs," each filed Aug. 5, 2005, assigned to the assignee of the present invention and incorporated by reference herein.

FIELD OF THE INVENTION

The present invention relates to computer security techniques for packet-based communications networks, and more particularly, to methods and apparatus for detecting and denouncing unwanted traffic, such as Denial of Service attacks and other malicious attacks, in such packet-based networks.

BACKGROUND OF THE INVENTION

Malicious attacks, such as Denial-of-service (DoS) attacks, attempt to make computer resources unavailable to their intended users. For example, a DoS attack against a web server often causes the hosted web pages to be unavailable. DoS attacks can cause significant service disruptions when limited resources need to be allocated to the attackers instead of to legitimate users. The attacking machines typically inflict damage by sending a large number of Internet Protocol (IP) packets across the Internet, directed to the target victim of the attack. For example, a DoS attack can comprise attempts to "flood" a network, thereby preventing legitimate network traffic, or to disrupt a server by sending more requests than the server can handle, thereby preventing access to one or more services.

A number of techniques have been proposed or suggested for defending against such malicious attacks. For example, U.S. patent application Ser. No. 11/197,842, entitled "Method and Apparatus for Defending Against Denial of Service Attacks in IP Networks by Target Victim Self-Identification and Control," and U.S. patent application Ser. No. 11/197,841, entitled "Method and Apparatus for Defending Against Denial of Service Attacks in IP Networks Based on Specified Source/Destination IP Address Pairs," disclose techniques for detecting and denouncing DoS attacks.

Systems that defend against such malicious attacks typically employ a detector associated with the customer network and a central filter in the network of the service provider to protect the customer network against malicious attacks. Generally, the detector will detect a malicious attack against the customer network and will send one or more denunciation or notification messages to the central filter. A malicious attack is typically detected by inspecting the packets received at the target victim for one or more predefined strings. The predefined strings, however, can often match legitimate attempts to access the target victim. Thus, the detector must inspect potentially many accesses and responses while keeping information about the source endpoint doing the access. In addition, such packet inspection techniques do not work over an encrypted link and can often be fooled by adding additional elements in the path to be accessed.

A need therefore exists for improved methods and apparatus for detecting unwanted traffic in one or more packet networks utilizing string analysis.

SUMMARY OF THE INVENTION

Generally, methods and apparatus are provided for detecting unwanted traffic in one or more packet networks utilizing string analysis. According to one aspect of the invention, unwanted traffic received by a target victim, such as a malicious attack, is detected by maintaining a rule base identifying one or more string expressions; analyzing one or more error entries in a log file, the log file comprising one or more requests received by the target victim; determining if the one or more requests include a string that matches one or more of the string expressions in the rule base; and sending a denunciation message to a central filter if the one or more requests include a string that matches one or more of the string expressions in the rule base.

The string expressions may comprise, for example, a string or a regular expression. The string expressions can represent one or more resources that an attacker may attempt to access. The error entries generally correspond to an attempt by an attacker to probe for a stored location of one or more resources maintained by the target victim. The rule base optionally identifies a corresponding action for each of the string expressions.

A more complete understanding of the present invention, as well as further features and advantages of the present invention, will be obtained by reference to the following detailed description and drawings.

DETAILED DESCRIPTION

The present invention provides improved methods and apparatus for detecting unwanted traffic in one or more packet networks utilizing string analysis. According to one aspect of the present invention, unwanted traffic received at a target victim, such as a Denial of Service or another malicious attack, is detected by analyzing one or more log files, such as web server log files. Attackers typically attempt to exploit a weakness in a target system to compromise the system. For example, one or more vulnerabilities can be exploited by accessing a file on the target system. Typically, the attacker does not know exactly where the target file is stored or rooted on the target system, so a number of attempts are often made to access the target file, often referred to as "probes."

Thus, an exemplary embodiment of the present invention analyzes one or more log files to determine whether each attempted access to the target system was successful. If an access was successful (e.g., an attempt to access a file at its proper location), it is assumed to be a legitimate access and further access by the endpoint is allowed (nonetheless, one embodiment of the present invention allows a successful access to be recorded for further analysis and may be blocked at a later time). An unsuccessful access is further analyzed to determine if the attempted path matches one or more predefined strings that are associated with files that the target system wishes to protect. An unsuccessful attempt that matches one or more predefined strings is deemed to be a malicious attack and a denunciation message is sent to the central filter. The present invention will thus detect a first unsuccessful probe and block the sender from sending further probes.

Figure 1:
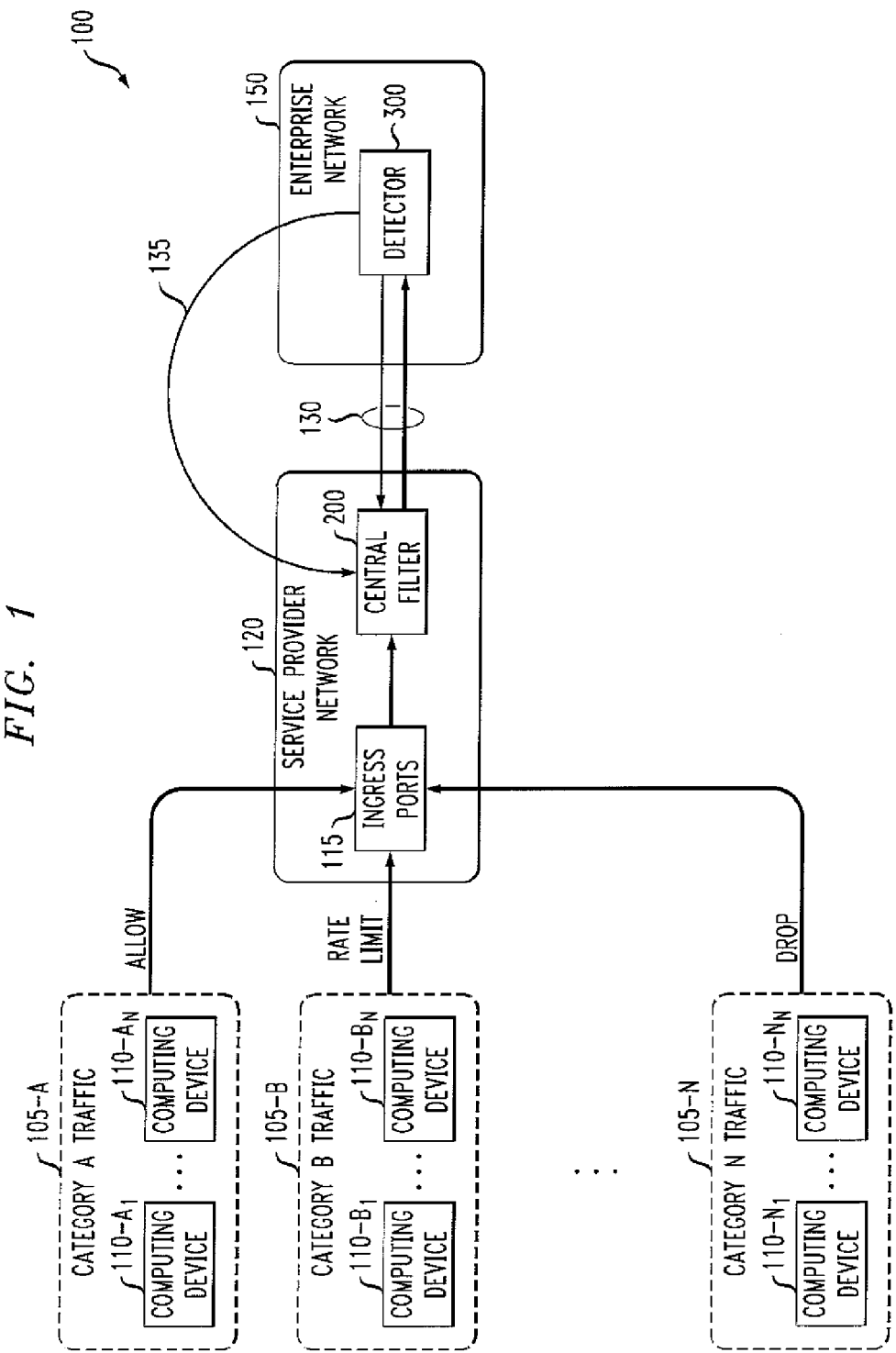
FIG. 1 illustrates a network environment in which the present invention may operate.

FIG. 1 illustrates a network environment 100 in which the present invention may operate. As shown in FIG. 1, an enterprise network 150 protects itself against unwanted traffic, such as spam or malicious attacks, using a detector 300, as discussed further below in conjunction with FIG. 3. The enterprise network 150 allows enterprise users to access the Internet or another network by means of a service provider network 120. The service provider network 120 provides service to users of the enterprise network 150, and receives packets from various sources by means of ingress ports 115 and transmits them to the indicated destination in the enterprise network 150.

In one exemplary embodiment, the detector 300 cooperates with a central filter 200, discussed further below in conjunction with FIG. 2, to protect itself against malicious attacks. Generally, as discussed further below, the detector 300 will detect a malicious attack, such as a Denial of Service attack, against the enterprise network 150 and will notify the central filter 200 maintained by the service provider.

The central filter 200 serves to limit the traffic that reaches the enterprise network 150 by means of the service provider network 120. The detector 300 typically sits behind the firewall in the enterprise network 150 and the detector 300 typically sends denunciation messages to the central filter 200 of the ISP. The detector 300 and central filter 200 may be implemented based on the teachings of U.S. patent application Ser. No. 11/197,842, entitled "Method and Apparatus for Defending Against Denial of Service Attacks in IP Networks by Target Victim Self-Identification and Control," and U.S. patent application Ser. No. 11/197,841, entitled "Method and Apparatus for Defending Against Denial of Service Attacks in IP Networks Based on Specified Source/Destination IP Address Pairs," as modified herein to incorporate the features and functions of the present invention.

The detector 300, upon determining that a Denial of Service attack is being perpetrated on the enterprise network 150, transmits one or more source/destination IP address pairs to the central filter 200, which causes the service provider network 120 to limit (e.g., block or rate limit) the transmission of IP packets whose source IP address and destination IP address match those of any of the transmitted source/destination IP address pairs, thereby limiting (or eliminating) the Denial of Service attack from one or more source devices 110 to the attack victim within the enterprise network 150. The detector 300 optionally transmits the source/destination IP address pairs with use of a redundant connection 135 or the primary connection 130. According to one aspect of the present invention, a Denunciation Protocol is provided for communications between the detector 300 and the central filter 200.

The victim of a Denial of Service attack can thus "push back" by denouncing attackers to its service provider, which will, in response, update a table of source/destination IP address pairs that are to be blocked. More specifically, upon recognizing that an attack is taking place, the victim (enterprise network 150) will identify one or more pairs of source and destination IP addresses that are specified in packets deemed to be a part of the attack, and communicate those IP address pairs to the service provider for blocking by the central filter 200.

As shown in FIG. 1, packets destined to the subscriber (enterprise network 150) is classified into classes, generally corresponding to "good" and "bad" traffic. For example, good traffic from Category A 105-A is delivered (allowed) and bad traffic from Category B 105-B and Category N 105-N is rate-limited or dropped, respectively. Source computing devices 110 that send traffic to a destination address associated with the enterprise network 150 are classified into one of the N exemplary categories. Denunciations shift the boundary between good and bad traffic.

Note that, in accordance with certain illustrative embodiments, the attacker (i.e., the identified source IP address or addresses) need not be cut off completely from the network, but rather is prohibited only from sending packets to the victim (i.e., the identified destination IP address or addresses). This may be advantageous, particularly in the case where the identified source IP address or addresses represent a legitimate user which has been taken over (e.g., a zombie) for the given attack against the victim. Thus, the owner of the machine that was taken over may continue to use the system for legitimate purposes, while the attack being perpetrated on the victim (possibly unbeknownst to the legitimate user) is nonetheless advantageously thwarted. Moreover, note that the technique in accordance with such illustrative embodiments also advantageously provides protection from overly zealous identification of attackers by a given victim. Since, in accordance with the principles of the present invention, the identification of an attack is left to the discretion of the apparent victim, it is clearly advantageous that only traffic to the given victim is being cut off or restricted.

The present invention provides a string matching detection process 700, discussed further below in conjunction with FIG. 7, that detects unwanted traffic, such as a malicious attack, by analyzing one or more log files. A malicious attack may also be recognized by the victim by one or more additional algorithms of varying degrees of simplicity or sophistication, which are outside the scope of the present invention, but many of which will be obvious to those skilled in the art. For example, in accordance with one illustrative embodiment of the invention, application logs may be examined and an attack may be identified based solely on the presence of very high traffic levels (e.g., high packet rates) from either a single identified source or a plurality of identified sources. It is noted that this is one conventional method of identifying the presence of a Denial of Service attack and will be familiar to those of ordinary skill in the art.

In other implementations, however, application based analysis of packet contents may be performed to identify packets or sequences of packets having a suspicious nature, such as, for example, recognizing that there have been frequent database searches for non-existent database elements; recognizing that there have been multiple requests apparently from a human being which occur at a higher rate than a person could initiate them; identifying syntactically invalid requests; and identifying suspicious amounts of traffic at particularly sensitive times in the operation of a normally occurring activity. An example of the latter class of suspicious packets might be identified, for example, if a stock trading web site notices particularly disruptive traffic at a sensitive time during an imminent stock transaction. In further variations, a number of different indicia of a possible attack, which may include, for example, one or more of the above described situations, may be advantageously combined in a more sophisticated analysis to identify the presence of an attack.

The exemplary detection system can operate in one of two modes. When the zone is in a "default-drop" mode, the default behavior is to filter all traffic destined for the zone except traffic explicitly listed on the default-drop. Generally, in a default-drop mode, the filter will automatically drop all traffic unless explicit authorized (for example, matching a predefined allow filter). When the zone is in default-allow mode, on the other hand, all traffic to the subscriber is passed by the filter, except that traffic that explicitly matches a predefined drop filter.

Figure 2:
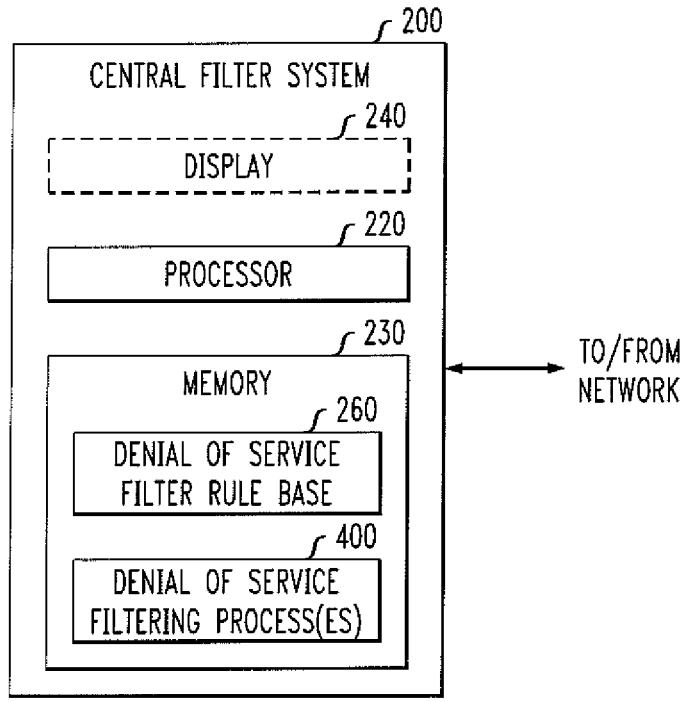
FIG. 2 is a schematic block diagram of the central filter system of FIG. 1.

FIG. 2 is a schematic block diagram of the central filter system 200 of FIG. 1 that can implement the processes of the present invention. As shown in FIG. 2, memory 230 configures the processor 220 to implement the denial of service filtering methods, steps, and functions disclosed herein. The memory 230 could be distributed or local and the processor 220 could be distributed or singular. The memory 230 could be implemented as an electrical, magnetic or optical memory, or any combination of these or other types of storage devices. It should be noted that each distributed processor that makes up processor 220 generally contains its own addressable memory space. It should also be noted that some or all of computer system 200 can be incorporated into an application-specific or general-use integrated circuit.

As shown in FIG. 2, the exemplary memory 230 includes a denial of service filter rule base 260 and one or more denial of service filtering processes 400, discussed further below in conjunction with FIG. 4. Generally, the exemplary denial of service filter rule base 260 is a conventional filter base containing source/destination address pairs associated with traffic that should be limited or allowed by the central filter 200. The denial of service filtering process 400 is an exemplary method for defending against Denial of Service or other attacks in accordance with the present invention.

The central filter 200 may be implemented as a stand-alone box included in the service provider network 120, or, alternatively, as a line card incorporated into otherwise conventional network elements that are already present in the network 120. Moreover, in accordance with certain illustrative embodiments, the central filter 200 may be advantageously deployed by the carrier within the network 120 at a location relatively close to the attack origins, or it may be initially placed to advantageously defend premium customers from attack.

Figure 3:
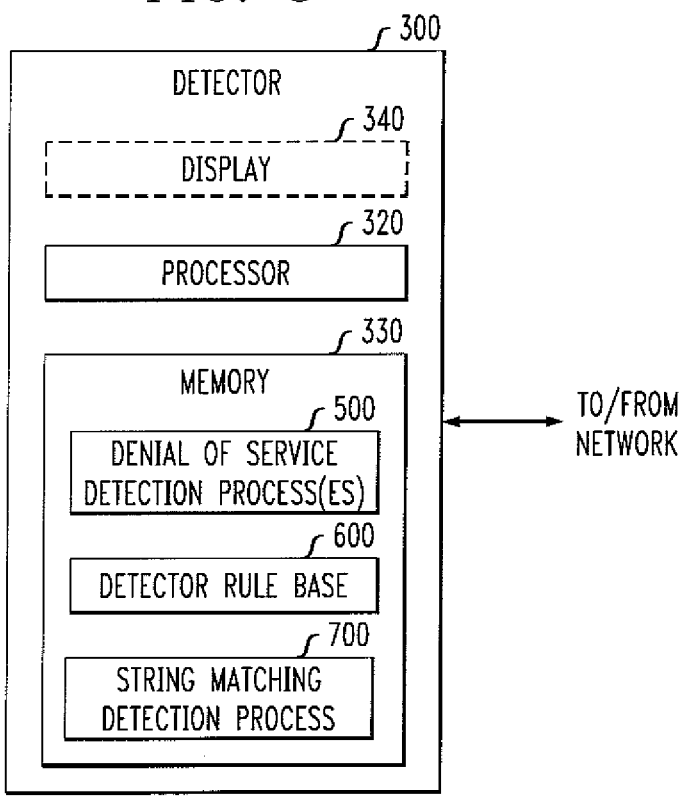
FIG. 3 is a schematic block diagram of the detector of FIG. 1.

FIG. 3 is a schematic block diagram of the detector 300 of FIG. 1 that can implement the processes of the present invention. As shown in FIG. 3, memory 330 configures the processor 320 to implement the denial of service filtering methods, steps, and functions disclosed herein. The memory 330 could be distributed or local and the processor 320 could be distributed or singular. The memory 330 could be implemented as an electrical, magnetic or optical memory, or any combination of these or other types of storage devices. It should be noted that each distributed processor that makes up processor 320 generally contains its own addressable memory space. It should also be noted that some or all of computer system 300 can be incorporated into an application-specific or general-use integrated circuit.

As shown in FIG. 3, the exemplary memory 330 includes one or more denial of service detection processes 500, a detector rule base 600 and a string matching detection process 700, each discussed further below in conjunction with FIGS. 5 through 7, respectively. The denial of service detection process 500 is an exemplary method for detecting and defending against Denial of Service or other attacks in accordance with the present invention. The detector rule base 600 records the strings associated with files that the target system wishes to protect. The string matching detection process 700 analyzes one or more log files to identify unsuccessful attempts to access one or more files at the target system that match one or more predefined strings from the detector rule base 600.

Figure 4:
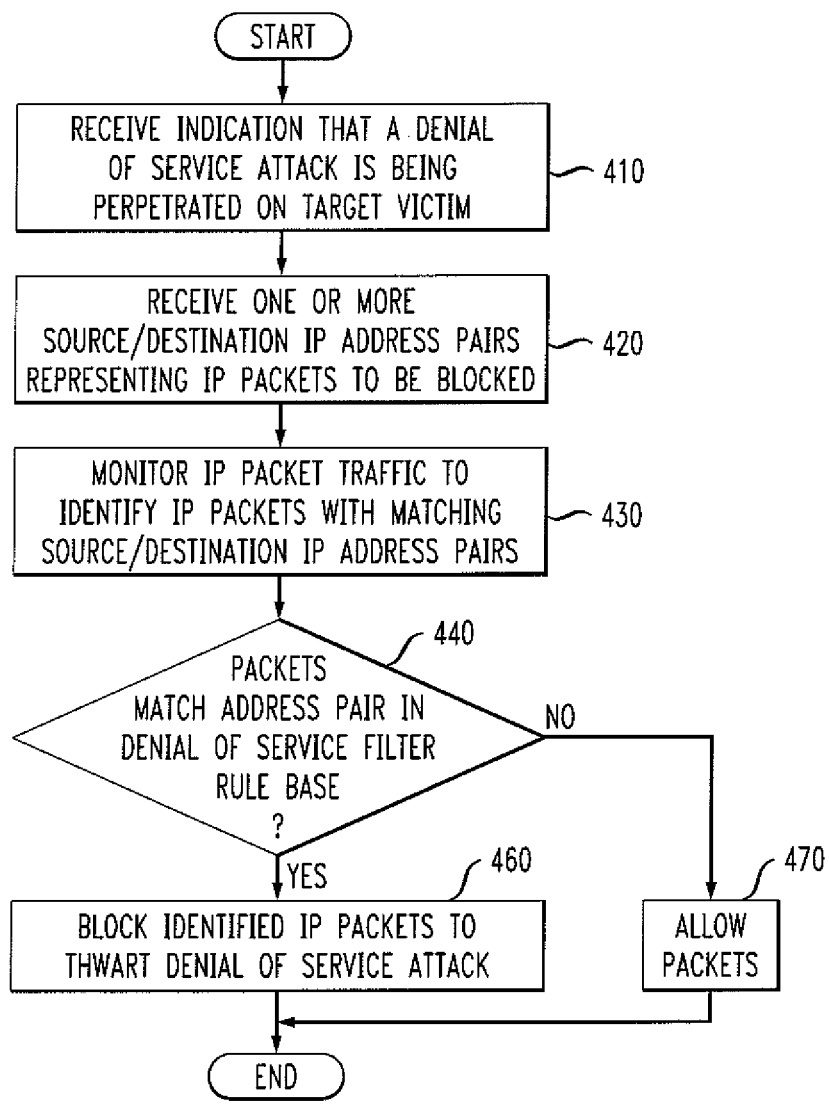
FIGS. 4 and 5 are flow charts describing exemplary implementations of a denial of service processes incorporating features of the present invention.

FIG. 4 is a flow chart describing an exemplary implementation of a denial of service filtering process 400 incorporating features of the present invention. It is noted that the exemplary denial of service filtering process 400 is implemented for a "default-allow" mode. An implementation for a "default drop" mode would be readily apparent to a person of ordinary skill in the art. Generally, the denial of service filtering process 400 is an exemplary method for defending against Denial of Service or other attacks in accordance with the present invention. The illustrative denial of service filtering process 400 is performed at the central filter 200 and begins during step 410 by receiving an indication from the detector 300 that a Denial of Service attack or another malicious attack is being perpetrated on a given target victim in the enterprise network 150.

Thereafter, during step 420, the network carrier receives one or more source/destination IP address pairs from the detector 300 representative of IP packets that should be blocked in order to thwart the Denial of Service attack. Illustratively, the source IP addresses are those of the attacking (e.g., "zombie") computing devices 110 and the destination IP addresses are those associated with the target victim itself. The messages from the detector 300 are transmitted in accordance with the DP, discussed below.

The network carrier then monitors the IP packet traffic during step 430 to identify IP packets whose source and destination IP addresses match one of the received source/destination IP address pairs. A test is performed during step 440 to determine if one or more packets match an address pair in the denial of service filter rule base 260.

If it is determined during step 440 that one or more packets match an address pair in the denial of service filter rule base 260, then the packets should be dropped or limited during step 460.

If it was determined during step 440 that one or more packets do not match an address pair in the denial of service filter rule base 260, then the packets are allowed to be transmitted to the enterprise network 150 during step 470.

Figures 5, 6:
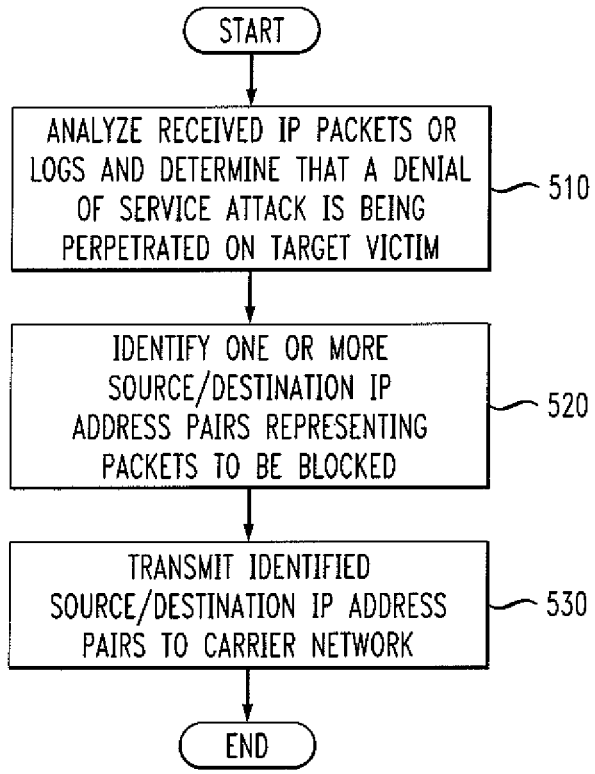
FIG. 6 is a sample table describing an exemplary implementation of a detector rule base incorporating features of the present invention.

FIG. 5 is a flow chart describing an exemplary implementation of a denial of service detection process 500 incorporating features of the present invention. Generally, the denial of service detection process 500 is an exemplary method for defending against Denial of Service or other attacks in accordance with the present invention. The illustrative denial of service detection process 500 is performed by a detector 300 at a target victim and begins during step 510 by determining that a Denial of Service attack or another malicious is being perpetrated thereupon based on an analysis of received IP packets and/or server logs. As discussed further below in conjunction with FIG. 7, the present invention provides an exemplary string matching detection process 700 that detects an attack by performing a string matching operation against server log files.

During step 520, one or more source/destination IP address pairs are identified as being representative of IP packets that should be blocked in order to thwart the Denial of Service attack. (Illustratively, the source IP addresses are those of the attacking "zombie" machines 110 and the destination IP addresses are those associated with the target victim itself.) Finally, during step 530, the identified source/destination IP address pairs are transmitted to the central filter 200 of the victim's carrier network to enable the carrier network to block transmission of IP packets having matching source and destination IP addresses.

FIG. 6 is a sample table describing an exemplary implementation of a detector rule base 600 incorporating features of the present invention. Generally, the detector rule base 600 records the strings associated with files that the target system wishes to protect. As shown in FIG. 6, the exemplary detector rule base 600 records a number of different strings and a corresponding action to be performed when the string is detected (e.g., drop or limit). For example, one known malicious attack probes for "command.exe" to obtain access to the command shell on the remote machine. Thus, the exemplary detector rule base 600 includes a rule to look for the string "command.exe."

Figure 7:
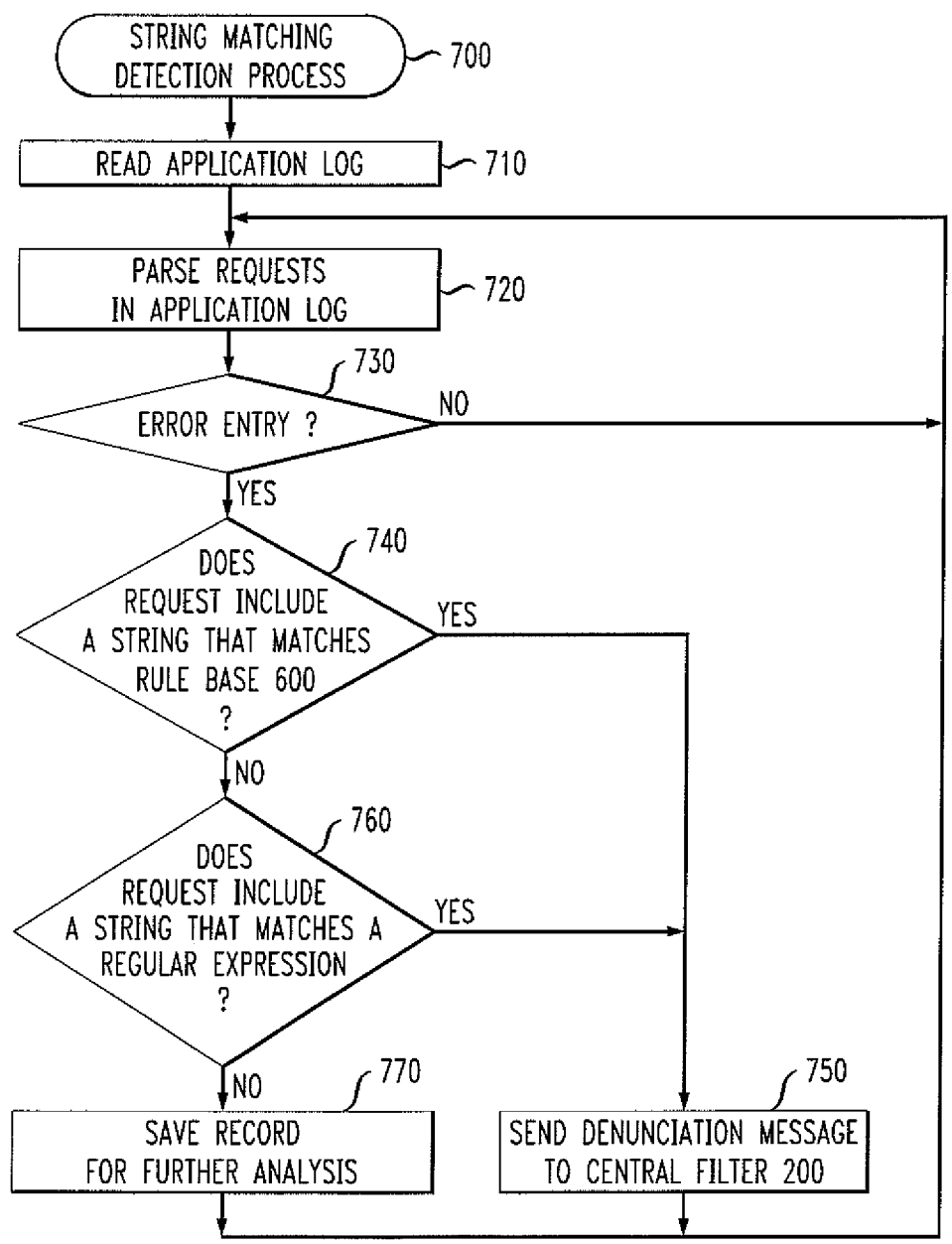
FIG. 7 is a flow chart describing an exemplary implementation of a string matching detection process incorporating features of the present invention.

FIG. 7 is a flow chart describing an exemplary implementation of a string matching detection process 700 incorporating features of the present invention. As shown in FIG. 7, the exemplary string matching detection process 700 is initiated during step 710 by reading an application log containing, for example, entries for each attempted access to the target system, and each response by the target system.

The requests in each entry in the application log are parsed during 720. A test is performed during step 730 to determine if the current entry being processed is an error entry. As noted above, successful accesses (e.g., an attempt to access a file at its proper location) are assumed to be a legitimate access and further access by the endpoint is allowed.

If it is determined during step 730 that the current entry being processed is not an error entry, then program control returns to step 720 to parse the next entry in the application log. In one exemplary implementation, if the current entry is not an error entry, then the record can optionally be saved during step 770, as discussed below, for further analysis (and may be blocked at a later time). If, however, it is determined during step 730 that the current entry being processed is an error entry, then a further test is performed during step 740 to determine if the request includes a string that matches rule base 600.

If it is determined during step 740 that the request includes a string that matches rule base 600, then a Denunciation Message is sent to central filter 200 during step 750. If, however, it is determined during step 740 that the request does not include a string that matches rule base 600 then a further test is performed during step 760 to determine if the request include a string that matches a regular expression.

If it is determined during step 760 that the request includes a string that matches a regular expression, then a Denunciation Message is sent to central filter 200 during step 750. If, however, it is determined during step 760 that the request does not include a string that matches a regular expression, then the record is optionally saved during step 770 for further analysis.

The present invention may work in conjunction with one or more supplementary tools. For example, such tools might include Internet server plug-ins for recognition of leveraged Denial of Service attacks, links to various IDS systems (Intrusion Detection Systems), databases for network diagnosis (see discussion above), and methods for providing guidance for placement of Zapper functionality within a given carrier's infrastructure. Illustrative embodiments of the present invention which provide various ones of these supplementary tools will be obvious to those skilled in the art in light of the disclosure herein.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for detecting unwanted traffic received by a target victim, the target victim having one or more destination addresses, the method comprising the steps of:

maintaining a rule base identifying one or more string expressions;

analyzing one or more error entries in a log file, said log file comprising one or more requests received by said target victim, wherein said one or more error entries correspond to an unsuccessful attempt by an attacker to access a stored location of one or more files maintained by said target victim;

determining if one or more requests associated with at least one of said unsuccessful attempt error entries include a string that matches one or more of said string expressions in said rule base associated with one or more predefined protected files; and sending a denunciation message to a central filter if said one or more requests associated with at least one of said unsuccessful attempt error entries include a string that matches one or more of said string expressions in said rule base associated with one or more predefined protected files.

2. The method of claim 1, wherein said unwanted traffic comprises a malicious attack.

3. The method of claim 1, wherein said one or more string expressions comprises a string.

4. The method of claim 1, wherein said one or more string expressions comprises a regular expression.

5. The method of claim 1, wherein said one or more string expressions represent one or more resources that an attacker may attempt to access.

6. The method of claim 1, wherein said one or more error entries correspond to an attempt by an attacker to probe for a stored location of one or more resources maintained by said target victim.

7. The method of claim 1, wherein said denunciation message comprises one or more source/destination address pairs.

8. The method of claim 1, wherein said denunciation message comprises one or more source addresses.

9. The method of claim 1, wherein said rule base identifies a corresponding action for each of said string expressions.

10. The method of claim 1, further comprising the step of recording information associated with one or more successful accesses of a computer system associated with said target victim for further analysis, wherein said successful accesses are identified in said log file.

11. An apparatus for detecting unwanted traffic received by a target victim, the apparatus comprising:
a memory; and
at least one processor, coupled to the memory, operative to:
maintain a rule base identifying one or more string expressions;
analyze one or more error entries in a log file, said log file comprising one or more requests received by said target victim, wherein said one or more error entries correspond to an unsuccessful attempt by an attacker to access a stored location of one or more files maintained by said target victim;
determine if one or more requests associated with at least one of said unsuccessful attempt error entries include a string that matches one or more of said string expressions in said rule base associated with one or more predefined protected files; and
send a denunciation message to a central filter if said one or more requests associated with at least one of said unsuccessful attempt error entries include a string that matches one or more of said string expressions in said rule base associated with one or more predefined protected files.

12. The apparatus of claim 11, wherein said unwanted traffic comprises a malicious attack.

13. The apparatus of claim 11, wherein said one or more string expressions comprises a string.

14. The apparatus of claim 11, wherein said one or more string expressions comprises a regular expression.

15. The apparatus of claim 11, wherein said one or more string expressions represent one or more resources that an attacker may attempt to access.

16. The apparatus of claim 11, wherein said one or more error entries correspond to an attempt by an attacker to probe for a stored location of one or more resources maintained by said target victim.

17. The apparatus of claim 11, wherein said rule base identifies a corresponding action for each of said string expressions.

18. The apparatus of claim 11, wherein said processor is further configured to record information associated with one or more successful accesses of a computer system associated with said target victim for further analysis, wherein said successful accesses are identified in said log file.

19. An article of manufacture for detecting unwanted traffic received by a target victim, comprising a non-transitory machine readable recordable medium containing one or more programs which when executed implement the steps of:
maintaining a rule base identifying one or more string expressions;
analyzing one or more error entries in a log file, said log file comprising one or more requests received by said target victim, wherein said one or more error entries correspond to an unsuccessful attempt by an attacker to access a stored location of one or more files maintained by said target victim;
determining if one or more requests associated with at least one of said unsuccessful attempt error entries include a string that matches one or more of said string expressions in said rule base associated with one or more predefined protected files; and
sending a denunciation message to a central filter if said one or more requests associated with at least one of said unsuccessful attempt error entries include a string that matches one or more of said string expressions in said rule base associated with one or more predefined protected files.

20. The article of manufacture of claim 19, wherein said one or more string expressions comprises one or more of a string and a regular expression.

* * * * *